US009734869B2

(12) United States Patent
Rav-Acha et al.

(10) Patent No.: US 9,734,869 B2
(45) Date of Patent: Aug. 15, 2017

(54) METHOD AND SYSTEM FOR AUTOMATIC LEARNING OF PARAMETERS FOR AUTOMATIC VIDEO AND PHOTO EDITING BASED ON USER'S SATISFACTION

(71) Applicant: MAGISTO LTD., Nes-Ziona (IL)

(72) Inventors: Alexander Rav-Acha, Rehovot (IL); Oren Boiman, Sunnyvale, CA (US)

(73) Assignee: MAGISTO LTD., Nes-Ziona (IL)

( * ) Notice: Subject to any disclaimer, the term of this patent is extended or adjusted under 35 U.S.C. 154(b) by 0 days.

(21) Appl. No.: 14/644,350

(22) Filed: Mar. 11, 2015

(65) Prior Publication Data
US 2015/0262615 A1    Sep. 17, 2015

Related U.S. Application Data

(60) Provisional application No. 61/950,894, filed on Mar. 11, 2014.

(51) Int. Cl.
*H04N 5/93* (2006.01)
*G11B 27/031* (2006.01)
*H04N 21/854* (2011.01)
*H04N 1/00* (2006.01)
*H04N 21/258* (2011.01)
(Continued)

(52) U.S. Cl.
CPC ....... *G11B 27/031* (2013.01); *H04N 1/00167* (2013.01); *H04N 21/25891* (2013.01); *H04N 21/2665* (2013.01); *H04N 21/4223* (2013.01); *H04N 21/431* (2013.01); *H04N 21/854* (2013.01)

(58) Field of Classification Search
CPC ............ H04N 21/854; H04N 1/00167; H04N 21/25891; H04N 21/2665; H04N 21/4223; H04N 21/431; G11B 27/031
USPC ......................................... 386/281, 248, 282
See application file for complete search history.

(56) References Cited

U.S. PATENT DOCUMENTS

| 2006/0015904 A1* | 1/2006 | Marcus | ................ G11B 27/034 725/46 |
| 2006/0187305 A1* | 8/2006 | Trivedi | .............. G06K 9/00234 348/169 |

(Continued)

OTHER PUBLICATIONS

Cohen Ira et al. "Facial Expression Recognition from Video Sequences: Temporal and Static Modeling" published on CVIU 2003, vol. 91, 1-2, Jul. 2003, 160-187.

(Continued)

*Primary Examiner* — Helen Shibru
(74) *Attorney, Agent, or Firm* — Pearl Cohen Zedek Latzer Baratz LLP

(57) ABSTRACT

A method and system for modifying video editing parameters based on users satisfaction. The method may include the following steps: maintaining a plurality of video editing parameters; obtaining from a plurality of users, a plurality of footage sets each set comprising at least one of: a video sequence, and a still image; editing the plurality of footage sets, based on the plurality of video editing parameters, to yield respective edited videos; deriving user-satisfaction indicators from the plurality of users, responsive to viewing the respective edited videos; and automatically modifying at least one of the video editing parameters, based on the user-satisfaction indicators, to yield modified video editing parameters.

20 Claims, 3 Drawing Sheets

(51) Int. Cl.
*H04N 21/2665* (2011.01)
*H04N 21/4223* (2011.01)
*H04N 21/431* (2011.01)

(56) References Cited

U.S. PATENT DOCUMENTS

| | | | | | |
|---|---|---|---|---|---|
| 2007/0223871 | A1* | 9/2007 | Thelen | | G11B 27/105 386/280 |
| 2011/0184950 | A1* | 7/2011 | Skaff | | G06F 17/30265 707/737 |
| 2012/0057851 | A1* | 3/2012 | Yoshimine | | G11B 27/034 386/278 |
| 2012/0110429 | A1* | 5/2012 | Tzonis | | G06Q 10/10 715/230 |
| 2013/0262458 | A1* | 10/2013 | Saito | | G06F 17/30554 707/731 |
| 2013/0311556 | A1* | 11/2013 | Srivastava | | G06Q 50/01 709/204 |
| 2013/0339433 | A1* | 12/2013 | Li | | G06K 9/00 709/204 |
| 2013/0343727 | A1* | 12/2013 | Rav-Acha | | G11B 27/031 386/282 |
| 2014/0075335 | A1* | 3/2014 | Hicks | | G06Q 10/10 715/753 |
| 2014/0222913 | A1* | 8/2014 | Cathcart | | H04L 67/22 709/204 |
| 2014/0344718 | A1* | 11/2014 | Rapaport | | H04L 51/32 715/753 |
| 2015/0199010 | A1* | 7/2015 | Coleman | | A61B 5/0006 345/156 |
| 2015/0200999 | A1* | 7/2015 | Chen | | G06Q 10/101 386/285 |
| 2015/0262615 | A1* | 9/2015 | Rav-Acha | | G11B 27/031 386/281 |
| 2015/0281566 | A1* | 10/2015 | Rav-Acha | | H04N 5/23219 348/222.1 |

OTHER PUBLICATIONS

Nicu Sebe et al. "Emotion Recognition Based on Joint Visual and Audio Cues", published in ICPR 2006, vol. 1, 1136-1139.

* cited by examiner

|  | Tempo | Preferred Theme | 'Faces' Weight | 'Activity' Weight |
|---|---|---|---|---|
| Male-kid | High | 'Hipster' | 0.3 | 0.8 |
| Male-adult | High | 'Sport' | 0.2 | 0.6 |
| Female-Kid | Low | 'Kitsch' | 0.1 | 0.4 |
| Female-adult | High | 'Love' | 0.3 | 0.4 |

| | pace | Audio vs. music | Faces' weight | Activity weight |
|---|---|---|---|---|
| External attribute | | | | |
| Gender = Male, Editing Style = MTV, #faces in videos = 1 | High (=1) | Prefer music | 0.3 | 1.4 |
| Gender = Female, Editing Style = MTV, #faces in videos = 0 | High (=1) | Prefer music | 0 | 1.1 |
| Gender = Male, Editing Style = Traditional Film, #faces in videos = 1 | Low (=0) | Prefer audio | 2.2 | 0.5 |

METHOD AND SYSTEM FOR AUTOMATIC LEARNING OF PARAMETERS FOR AUTOMATIC VIDEO AND PHOTO EDITING BASED ON USER'S SATISFACTION

CROSS REFERENCE TO RELATED APPLICATIONS

This application claims the benefit of U.S. Provisional Patent Application No. 61/950,894, filed on Mar. 11, 2014, the entire content of which is incorporated herein by reference.

FIELD OF THE INVENTION

The present invention relates generally to the field of video editing and in particular to automatically modifying such parameters based on analyzing users satisfaction.

BACKGROUND OF THE INVENTION

Automatic and semi-automatic video editing of user-generated videos and photos are known in the art and are extremely popular with users of smartphones. The video editing is directed, in some solutions, to be tailored to the taste of the users, based on various assumptions.

User satisfaction is one of the most important metrics by which an automatically generated video may be measured. It, therefore, would be advantageous to provide a manner by which video editing parameters may be adjusted in order to offer a better match to user satisfaction of the edited videos of any given platform for automatic video editing.

SUMMARY OF THE INVENTION

Embodiments of the present invention provide a method and a system for modifying video editing parameters based on a user's satisfaction. The method may include the following steps: maintaining a plurality of video editing parameters; obtaining from a plurality of users, a plurality of footage sets each set comprising at least one of: a video sequence, and a still image; editing the plurality of footage sets, based on the plurality of video editing parameters, to yield respective edited videos; deriving user-satisfaction indicators from the plurality of users, responsive to viewing the respective edited videos; and automatically modifying at least one of the video editing parameters, based on the user-satisfaction indicators, to yield modified video editing parameters.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings:

FIG. 3 is a table illustrating an aspect of editing parameters in accordance with some embodiments of the present invention; and FIG. 4 is another table illustrating another aspect of editing parameters in accordance with some embodiments of the present invention.

Figure 1:
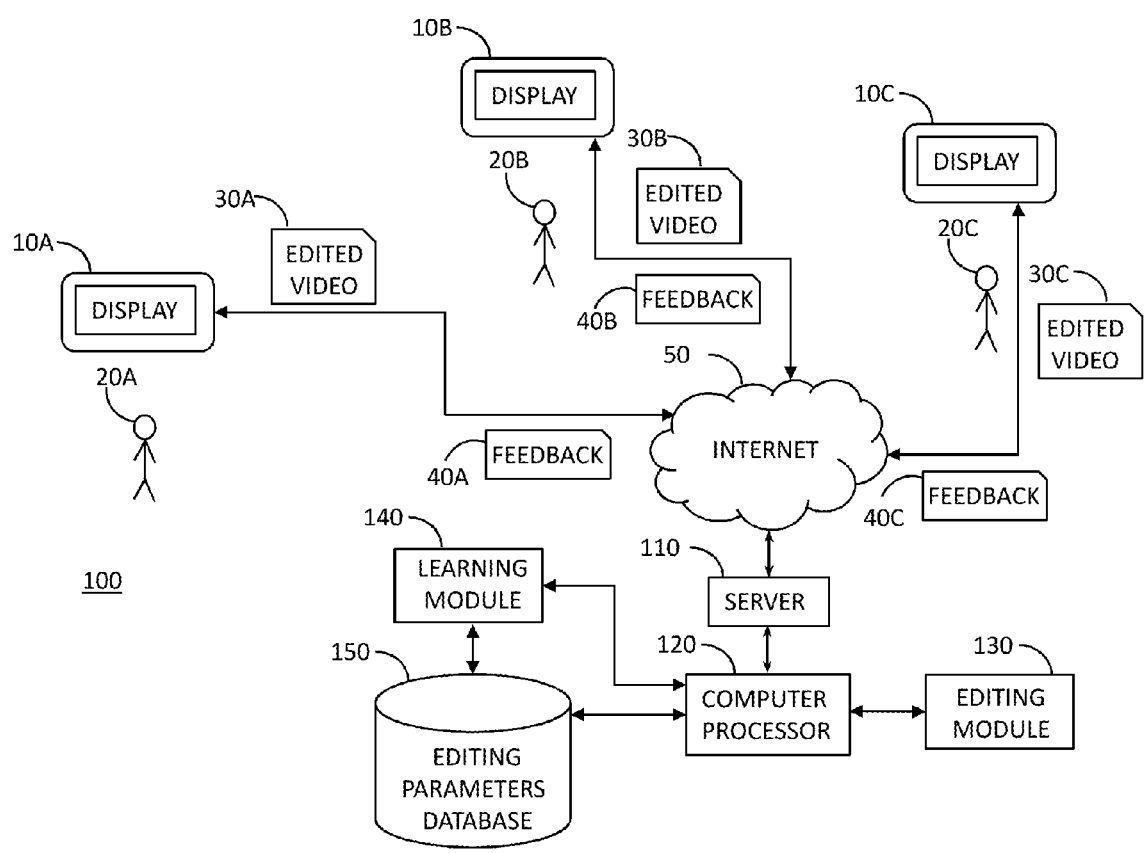
FIG. 1 is a block diagram illustrating the architecture of a system in accordance with some embodiments of the present invention.

The drawings together with the following detailed description make the embodiments of the invention apparent to those skilled in the art.

DETAILED DESCRIPTION OF THE INVENTION

It is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before the embodiments of the invention are explained in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

Some embodiments of the present invention provide a system for automatically learning the parameters of automatic video and photo editing. The automatic learning may be based on the rating or other satisfaction metrics of users that have been presented with the edited videos. The leaning of the parameters improves the editing in a way that increases the user satisfaction.

FIG. 1 shows a possible architecture of the system in accordance with embodiments of the present invention. System 100 may include a server 110 associated with a computer processor 120 and a database 150 configured to maintain a plurality of video editing parameters.

System 100 may further include a plurality of communication devices 10A-10C being in communication with server 110 possibly over network 50 (e.g. the Internet) and configured to obtain from a plurality of users 20A-20C respectively, a plurality of footage sets. Each footage set may include at least one of: a video sequence, and a still image. System 100 may include an editing module 130, executed by computer processor 120 and configured to edit the plurality of footage sets, based on the plurality of video editing parameters, to yield respective edited videos 30A-30C.

System 100 may include a learning module 140, executed by computer processor 120 and configured to derive user-satisfaction indicators from the plurality of users (such as feedback 40A-40C), responsive to viewing the respective edited videos by users 20A-20C.

Finally, computer processor 120 may be further configured to automatically modify at least one of the video editing parameters, based on the user-satisfaction indicators, to yield modified video editing parameters.

According to some embodiments of the present invention, the communication devices may be configured to capture the face of the user during or immediately after viewing the edited movie, and wherein the user-satisfaction is based on analyzing the facial expression of the captured face; and automatically deriving the user-satisfaction.

According to some embodiments of the present invention, the communication devices may be configured to capture auditory signals during or immediately after viewing the edited movie by the user, and wherein the user-satisfaction is based on analyzing the captured auditory signals, and automatically deriving the user-satisfaction.

Figure 2:
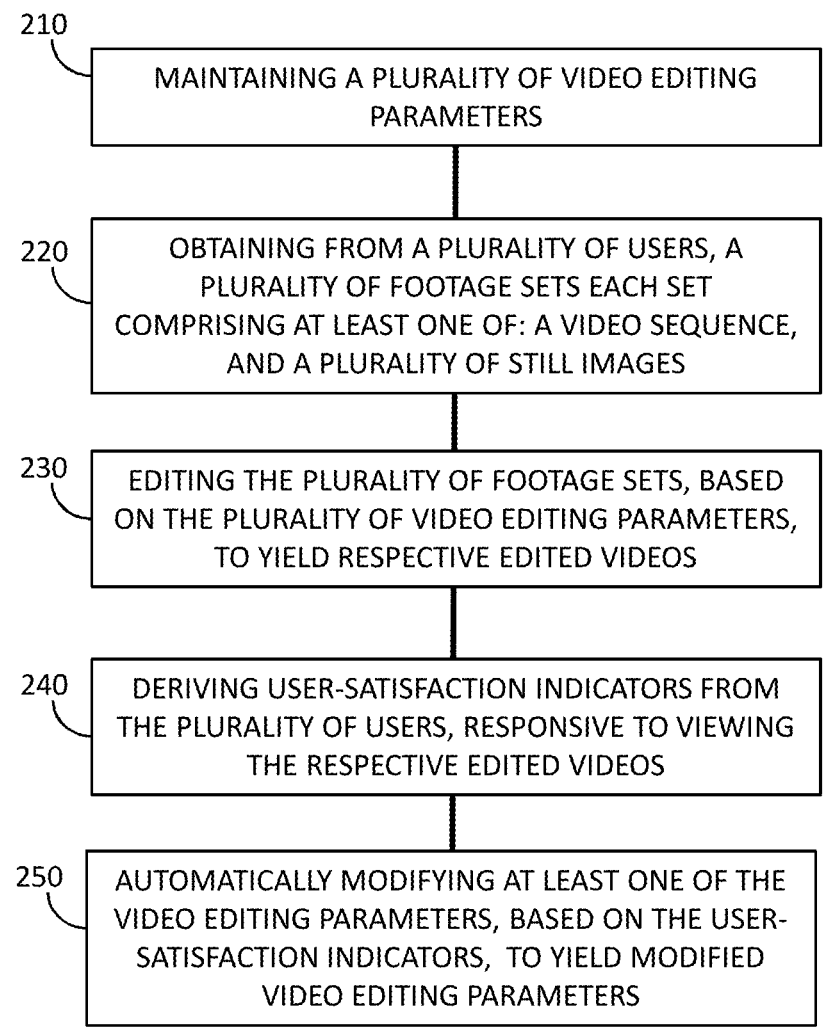
FIG. 2 is a high level flowchart illustrating a method in accordance with some embodiments of the present invention.

FIG. 2 is a high level flowchart illustrating a method in accordance with some embodiments of the present invention. Method 200 may include: maintaining a plurality of video editing parameters 210; obtaining from a plurality of users, a plurality of footage sets each set comprising at least one of: a video sequence, and still image 220; editing the plurality of footage sets, based on the plurality of video editing parameters, to yield respective edited videos 230; deriving user-satisfaction indicators from the plurality of users, responsive to viewing the respective edited videos 240; and automatically modifying at least one of the video editing parameters, based on the user-satisfaction indicators, to yield modified video editing parameters 250.

According to some embodiments of the present invention, the user satisfaction is based on a rating of the edited video as provided explicitly by the user.

According to some embodiments of the present invention, the user satisfaction may be automatically derived from actions and behaviors of the respective users.

According to some embodiments of the present invention, the actions of the respective users include at least one of: viewing beyond a predefined portion of the edited video, sharing, buying, becoming a premium user, saving, commenting, and deleting.

According to some embodiments of the present invention, the user satisfaction is based on a choice of a user out of multiple edited videos.

According to some embodiments of the present invention, the user satisfaction is based on priority made by a user relative to multiple edited videos.

According to some embodiments of the present invention, the user-satisfaction is based on capturing the face of the user during or immediately after viewing the edited movie, analyzing the facial expression of the captured face; and automatically deriving the user-satisfaction.

According to some embodiments of the present invention, the user-satisfaction is based on capturing auditory signals during or immediately after viewing the edited movie by the user; analyzing the captured auditory signals; and automatically deriving the user-satisfaction.

According to some embodiments of the present invention, the maintained set of video editing parameters are stored on a data-structure that associates user attributes with at least a subset of video editing parameters, and wherein the modified video editing parameters are associated with the profiles of the attributes of users.

According to some embodiments of the present invention, the modifying at least one of video editing parameters is performed only in a case that the user-satisfaction indicators meet certain statistical significance criteria.

According to some embodiments of the present invention, the maintained video editing parameters are stored on a data-structure that associates attributes of footage sets with at least a subset of video editing parameters; and wherein the modified video editing parameters are associated with the attributes of the footage sets being viewed by the plurality of users.

According to some embodiments of the present invention, the attributes of the footage sets comprise at least one of: type of media that constitute the footage; length of the footage; number of faces being detected within the footage.

The Editing Parameters

The editing might use various editing parameters that affect the editing. Some examples for such editing parameters are listed below, but other parameters may be used and learnt:

Pace (or tempo)—The pace of the edited video is an important parameter in video editing. It effects the duration and speed of the cuts in the editing. The pace may correspond to the editing style—slower pace is usually used for soft styles (nostalgic editing style, and the like), while fast pace is usually used for more energetic and rhythmic editing styles, e.g., an MTV style. The pace may vary at different parts of the edited video.

Output duration (of the editing video).

Parameter that controls the chronological order of the input assets. E.g., if it is set to 1, keep the original chronological order, and if it is set to 0, allow changing the order.

Attributes weights—There may be editing parameters that control the importance of different attributes in the selections of clips and photos for the resulting video. Videos or photo portions, which correspond to attributes having high importance will be more likely to be selected for the edited video. Such attributes may be, for example:

Face detection: Existence of a face in a frame or in a photo may be a criterion for selecting it in the edited video.

Important characters: in some cases, the existence of a face in the frame is not enough—a stronger criterion is recognizing this face as an important character: either a character that was marked in advance by the user as important, or automatically identified as important by the system (for example, if it appears frequently in the user's footage, or it the camera is zooming on this face).

Important object classes: same as for the faces, but more general (e.g., a pet).

Facial expressions: Expressions such as a smile or laughter may be used as criterions for selection. For example, a smiling face may have higher importance in the selection over a non-smiling face.

Activity: A pre-defined action (such as a "Jump") can be used as a criterion for an important moment. Alternatively, the action can be a general salient activity, even if it was not pre-defined. Salient moments can have higher importance.

Image quality: The quality of the image is also an important criterion for deciding on taking a photo: For example, the amount of noise, the focus, the existence of saturated regions, good or bad lightening, and the like. When the camera is shaking, the image may appear blurred ("motion blur"). Therefore, the system might decide to avoid moments with a significant amount of camera-motion.

An example for such an editing parameter might be the weight of the face attribute in the selection of clips and photos to the editing versus other attributes. If his weight is high, the system will tend to show more faces in the edited video, possibly on the account of other criterions.

Audio versus music—whether to use the original audio of the input videos, or the attached music. Different policies of mixture between both can also be controlled by this parameter.

Editing style—A set of style parameters may be used, denote as an "Editing Style" as it captures a wider range of parameters that controls the appearance of the resulting edited video. These editing styles may consist of the parameter examples described above and others. Common editing styles known in the literature (for manual video editing) are classical editing (following traditional rules of film editing such as "Continuity Editing") and MTV-like (or "Music-Clip") editing—focusing on rhythm and synchronization to music and less the story telling.

An explanation of how the editing is actually carried out based on the aforementioned editing parameters can be found, for example, in US Patent Application Publication No. 2011/0218997, which is incorporated herein by reference in its entirety.

Editing Parameters as a Function of User and Content

The editing parameters may be associated with some user profiles (for example—user age, gender, country), or more general user attributes (for example, history of preferences, history of actions, etc.). These user attributes may be obtained from the user (directly, e.g., by asking the user, or indirectly—for example via his profile in other services such as Facebook). The user attributes can also be derived from a statistical analysis of his actions and behavior.

In addition, these parameters may be a function of other external parameters, for example, a function of the specific user preferences for these edited videos. E.g., the user might manually choose an editing style, or a music, and still various editing parameters can be set automatically (e.g., pace) as a function of these preferences.

In addition, the editing parameters may also be a function of various attributes extracted from analysis of the input data. For example, they can be a function of the topic of the input footage (videos and photo), or, a more simple example, a function of the number of faces that appear in the input footage.

FIG. 3 illustrates a non-limiting possible way to associate editing parameters with user profile is using a data structure such as a table. In this example, there are 4 sets of editing parameters, corresponding to 4 profiles: {'male-kid', 'male-adult', 'female-kid' and 'female-adult'}.

FIG. 4 is a table illustrating a more general example, in which editing parameters are associated with both user profiles (e.g., gender), external parameters (e.g., the editing style selected by the user), and meta-data extracted from the input footage (e.g., number of faces detected in it).

Deriving the User Satisfaction

The most simple way to get the user satisfaction is by letting a user see an edited video, and give a rating (e.g., 1 to 5) to this video. Alternatively, user rating can be obtained indirectly based on user actions. For example, give a rate of 5 if the video was saved or 0 if it was deleted, or give a rate as a function of other user actions, such as—whether the user saved this video or deleted it, did he share this videos (e.g., in Facebook), what was the amount of the video that he have seen (unsatisfied user may stop watching the edited movie in the middle), and the like. Obviously, viewing and sharing the video will correspond to a higher user-satisfaction while deleting it indicate a lower user satisfaction, and the rate will be set accordingly.

As mentioned before, the user rating can be used as an input for the learning stage, together with additional information such as the user attributes (age, gender, and the like), the user preferences (e.g., editing style) and the meta-data extracted from the footage (e.g., faces, speech, and the like).

Recent advances in facial expression analysis allowed deriving the user's satisfaction automatically by capturing the user response to viewing the edited movie.

The face of the user can be captured automatically while watching the movie (or a short time afterwards) and his emotional response to the movie, extracted from a facial analysis of his face can be used to estimate his rate of satisfaction from the movie.

There is various literature on Facial expression analysis in photos and videos and on the derivation of the user's emotions (such as Surprised, Angry, Happy, Sad, etc') from it. For example a paper by Cohen Ira, Sebe Nicu, Garg Ashutosh, Chen Lawrence S. and Huang Thomas S., titled "Facial Expression Recognition from Video Sequences: Temporal and Static Modeling" published on CVIU 2003, Volume 91, No. 1-2, July 2003, pp. 160-187.

The facial expressions can directly, or via an additional emotional reaction analysis, be used to determine the user satisfaction, for example, using a simple table—giving a measure of satisfaction for each facial expression/emotional reaction (e.g., high satisfaction for "Happy" or "Smiling", versus low satisfaction for an emotional reaction of "Sad" or "Bored"). In addition to facial expression analysis, audio analysis can also help to automatically determine the user satisfaction, e.g., by detecting laugher, shouts, and the like. Combing visual and audio cues for emotion recognition is described, for example, in a paper by Nicu Sebel, Ira Cohen, Theo Gevers, and Thomas S. Huang, titled "Emotion Recognition Based on Joint Visual and Audio Cues", published in ICPR 2006, Volume 1, pp. 1136-1139.

It should be noted, that the translation of emotional reactions to user satisfaction measure may depend on the editing style (/theme ) that was used to create the edited movie. For example—"Sadness" may be associated with a low satisfaction if the theme was "Happy", while it may get a very high rate if the theme was "Nostalgic".

Learning the Editing Parameters

The learning of the editing parameters can be done in various ways. Three simple ways to carry out the learning are described herein:

1. AB testing: Building two pre-defined sets of editing parameters (e.g., one set in which pace is high, and one set in which pace is low) and checking the average user rating for each set, and choosing the one with the maximal average rating. Like in the general case, this AB testing can be applied for specific user profiles (or other external parameters), for example, only for female users who choose the editing style of 'MTV' and whose input footage include only videos (without photos) whose total duration is >30 seconds.

2. Energy minimization (e.g., annealing): Assuming that the space of editing parameters is discrete (by manually setting a finite set of possibilities for each parameter), the editing parameters can be learnt using common learning methods such as annealing, where the energy being minimized (as a function of the parameter set p) may be as in equation (1) below:

$$E(p)=1/|p|\Sigma_{i \in W}(\max\_rate-rate(i|p)) \quad (1)$$

Where W is a group of videos for which the external attributes (e.g., user type and preferences, #faces, and the like) are constant (So the parameter set for future videos corresponding to this group is optimized).

3. Regression: Assuming that the rating (or user's satisfaction) is continuous, or can be relaxed to be continuous, the relation between different editing parameter and the rating can be learnt via regression. In this case, the editing parameters will obviously be modified in a way that will maximize the expected rating. For example—if the rating is determined as inversely correlated with a specific parameter p, we will reduce p (obviously, this analysis is usually correct in a small parameter space. Changing a parameter to infinity or -infinity will, in general, yield bad editing results).

Since in the common case, user don't give multiple ratings to a given video (under different editing styles), it is assumed that the energy in equation 1 can be estimated correctly each time from different users and videos. This is correct if we assume that the rate of edited video is a random variable that depends on the editing parameters—a thus a good enough estimation of its expectancy can be achieved from enough samples.

Variation: Rating of Multiple Editing of the Same Footage

The quality of the learning of the video editing parameters can be improved if instead of a single rate per input footage, the system can obtain multiple ratings with different editing parameters (In the regular case, we have many ratings for each set of an editing parameter set, but they are obtained from different inputs and usually also from different users). This can be implemented, for example, by suggesting to the user a remix of the same input footage with a different set of editing parameters (e.g., a different editing style) and let him rate both the original and the remixed videos. A middle way between the two approaches is allowing the input footage to vary, but compare only multiple ratings of the same user (in this case the system obviously learn only from users with multiple sessions).

Setting Parameters Based on a Specific User History

The history of the user may also be used as external information for the learning. For example, we can learn if a user likes more the MTV editing style, and increase the probability of choosing this style for this user in the future.

The history of the user may include his previous rating decisions, or other decisions of this user, such as the editing style he was using for previous editing sessions.

This idea can be thought of as a special case of the framework described above, where the external user attributes now consists also of the statistics of the user history, e.g.—the number of times he chose the MTV style versus the number of times he chose the traditional film editing style.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs. The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for modifying video editing parameters comprising:
   maintaining a plurality of video editing parameters;
   obtaining from at least one user, a plurality of footage sets each set comprising at least one of: a video sequence, and still image;
   editing the plurality of footage sets, based on the plurality of video editing parameters, to yield respective edited videos;
   deriving user-satisfaction indicators from the at least one user, responsive to viewing the respective edited videos, wherein the user satisfaction indicates an emotional reaction of a user to viewing the respective edited videos; and
   automatically modifying at least one of the video editing parameters, based on the user-satisfaction indicators, to yield modified video editing parameters.

2. The method according to claim 1, wherein the user satisfaction is based on a rating of the edited video as provided explicitly by the user.

3. The method according to claim 1, wherein the user satisfaction is automatically derived from actions and behaviors of the respective users.

4. The method according to claim 3, wherein the actions of the respective users include at least one of: viewing beyond a predefined portion of the edited video, sharing, buying, becoming a premium user, saving, commenting, and deleting.

5. The method according to claim 1, wherein the user satisfaction is based on a choice of a user out of multiple edited videos.

6. The method according to claim 1, wherein the user satisfaction is based on priority made by a user relative to multiple edited videos.

7. The method according to claim 1, wherein the user-satisfaction is based on capturing the face of the user during or immediately after viewing the edited movie, analyzing the facial expression of the captured face; and automatically deriving the user-satisfaction.

8. The method according to claim 1, wherein the user-satisfaction is based on capturing auditory signals during or immediately after viewing the edited movie by the user; analyzing the captured auditory signals; and automatically deriving the user-satisfaction.

9. The method according to claim 1, wherein the maintained video editing parameters are stored on a data-structure that associates user attributes with at least a subset of video editing parameters, and wherein the modified video editing parameters are associated with at least one attribute of users.

10. The method according to claim 1, wherein the video editing parameters comprise at least one of: editing style; tempo; and theme.

11. The method according to claim 1, wherein the video editing parameters comprise an importance level of at least one of: scene representation; speech; activity, class of objects; and a specific object.

12. The method according to claim 1, wherein the modifying of the video editing parameters utilizes at least one of A-B testing; regression, and annealing.

13. The method according to claim 1, wherein the modifying is carried out for a plurality of users at the same time.

14. The method according to claim 9, wherein the user attribute comprises at least of one of: gender; age; and country.

15. The method according to claim 1, wherein the modifying at least one of video editing parameters is performed only in a case that the user-satisfaction indicators meet certain statistical significance criteria.

16. The method according to claim 1, wherein the maintained video editing parameters are stored on a data-structure that associates attributes of footage sets with at least a subset of video editing parameters; and wherein the modified video editing parameters are associated with at least one attribute of the footage sets being viewed by the plurality of users.

17. The method according to claim 16, wherein the attributes of the footage sets comprise at least one of: type of media that constitute the footage; length of the footage; number of faces being detected within the footage.

18. A system for modifying video editing parameters comprising:
   a server associated with a computer processor and a database configured to maintain a plurality of video editing parameters;
   a plurality of communication devices being in communication with the server and configured to obtain a plurality of footage sets each set comprising at least one of: a video sequence, and a still image;
   an editing module, executed by the computer processor and configured to edit the plurality of footage sets, based on the plurality of video editing parameters, to yield respective edited videos; and
   a learning module, executed by the computer processor and configured to derive user-satisfaction indicators from the plurality of users, responsive to viewing the respective edited videos, wherein the user satisfaction indicates an emotional reaction of a user to viewing the respective edited videos,
   wherein the computer processor is further configured to automatically modify at least one of the video editing parameters, based on the user-satisfaction indicators, to yield modified video editing parameters.

19. The system according to claim 18, wherein the communication devices are configured to capture the face of the user during or immediately after viewing the edited movie, and wherein the user-satisfaction is based on analyzing the facial expression of the captured face; and automatically deriving the user-satisfaction.

20. The system according to claim 18, wherein the communication devices are configured to capture auditory signals during or immediately after viewing the edited movie by the user, and wherein the user-satisfaction is based on analyzing the captured auditory signals, and automatically deriving the user-satisfaction.

* * * * *